United States Patent [19]

Kupersmit

[11] Patent Number: 4,688,979

[45] Date of Patent: Aug. 25, 1987

[54] STRAP SUPPORT SYSTEM FOR COLLAPSIBLE SHIPPING CONTAINERS

[76] Inventor: Julius B. Kupersmit, 299 W. 12th St., New York, N.Y. 10014

[21] Appl. No.: 749,747

[22] Filed: Jul. 1, 1985

[51] Int. Cl.⁴ ........................ B65D 37/00; B65G 65/00

[52] U.S. Cl. .................................... 414/403; 206/597; 220/7; 220/409; 220/181; 414/412; 414/786

[58] Field of Search ............... 414/412, 786, 403, 411, 414/416; 222/181, 185; 220/7, 409; 206/597, 600

[56] References Cited

U.S. PATENT DOCUMENTS

| | | | |
|---|---|---|---|
| 3,893,595 | 7/1975 | Khanna et al. | 222/185 |
| 4,143,796 | 3/1979 | Williamson et al. | 222/181 X |
| 4,397,406 | 8/1983 | Croley | 222/185 X |
| 4,432,689 | 2/1984 | Shell | 414/416 |

*Primary Examiner*—Robert J. Spar
*Assistant Examiner*—Stuart J. Millman
*Attorney, Agent, or Firm*—Charles E. Temko

[57] ABSTRACT

A strap support system for collapsible shipping containers whereby top-loaded containers may be emptied from the bottoms thereof while supported in a manner which permits, for example, the transfer of particulate material to a hopper or other receptacle is disclosed. In the case of particulate comestibles, the system includes the provision of an expandable sack-like element which contacts the transported material and prevents contact of this material with the reuseable components of the container.

3 Claims, 12 Drawing Figures

STRAP SUPPORT SYSTEM FOR COLLAPSIBLE SHIPPING CONTAINERS

BACKGROUND OF THE INVENTION

This invention relates generally to the field of collapsible shipping containers and more particularly to an improved system using containers of this type when shipping particular types of cargo.

In the transporting of particulate comestible material, such as sugar, flour, raisins, wheat grain and the like, it is conventional to package the same in large sacks of textile or synthetic resinous material for shipment. In some cases, the sacks are provided with ring means permitting engagement with overhead carrier means so that emptying of the sacks is accomplished by moving the sacks over a hopper or other receptacle following which the sack is cut on an undersurface thereof to provide an opening through which the contents flow under the action of gravity. Once emptied, the sack is discarded.

This means of transport is not without utility. However, there are accompanying disadvantages. The loaded sack is not rectangular in configuration, and thus cannot be stacked in a transporting vehicle for maximum space utilization. They cannot be readily moved by a forklift. Since the bags are totally unshielded, they are subject to puncture and accompanying loss of contents. The outer surfaces of the sacks become contaminated by contact with other objects during shipments, and can release foreign material with the cargo when it is empty. In the case of liquid materials, the result of puncture is usually the loss of the entire contents of the sack.

In the case of edible products, the principal justification of the use of sacks lies in low container cost, and the ability to discard containers after a single use.

SUMMARY OF THE INVENTION

Briefly stated, the invention lies in the provision of an improved means for transferring particulate material which will offer all of the above advantages, without the above-mentioned accompanying disadvantages. To this end, there is provided a collapsible reusable shipping carton of known type which is modified to allow top loading and bottom emptying of particulate material which is carried within a synthetic resinous disposable sack or sleeve which sack is discarded after emptying a single charge of cargo. Once emptied, the container is collapsed in the usual manner and returned to the shipper for reuse. Since the contents of the sack have not been allowed to contact the inner surfaces of the container, the return container remains in sanitary condition.

Thus, the shipping container made in accordance with the present invention includes foldable side walls, a lid or cover element, and a foldable reinforcing element which, in collapsible condition, is stored beneath the cover and overlying the bottom wall of the container.

In contrast to the above described container, the bottom wall of the present container and laminated slip sheet are connected to only one of the side walls, and are maintained in closed condition by the engagement of removable fasteners with two of the other walls. When loaded, the bottom wall and slip sheet are maintained by additional strapping, preferably of webbing to permit reuse. Additional webbing extends beneath the lower free edges of the side and end walls of the container, and above the upper surface of the bottom wall of the container. The two free ends of each member of the above-mentioned additional webbing are provided with ring means which lie generally in the area of the corners of the container to be selectively engaged with supporting links depending from an overhead "H" shaped frame which in turn, is carried by an overhead conveyor. Upon arrival of a container for draining, the first-mentioned strapping is opened after disconnecting the bottom wall clip means and the bottom wall and slip sheet are pivoted about a rectilinear line of interconnection to expose the sacks which are supported by the additional webbing. The sack is then opened by cutting a bottom surface, and the contents are allowed to drain.

BRIEF DESCRIPTION OF THE DRAWING

In the drawing, to which reference will be made in the specification, similar reference characters have been employed to designate corresponding parts throughout the several views.

DETAILED DESCRIPTION OF THE DISCLOSED INVENTION

Figure 1:
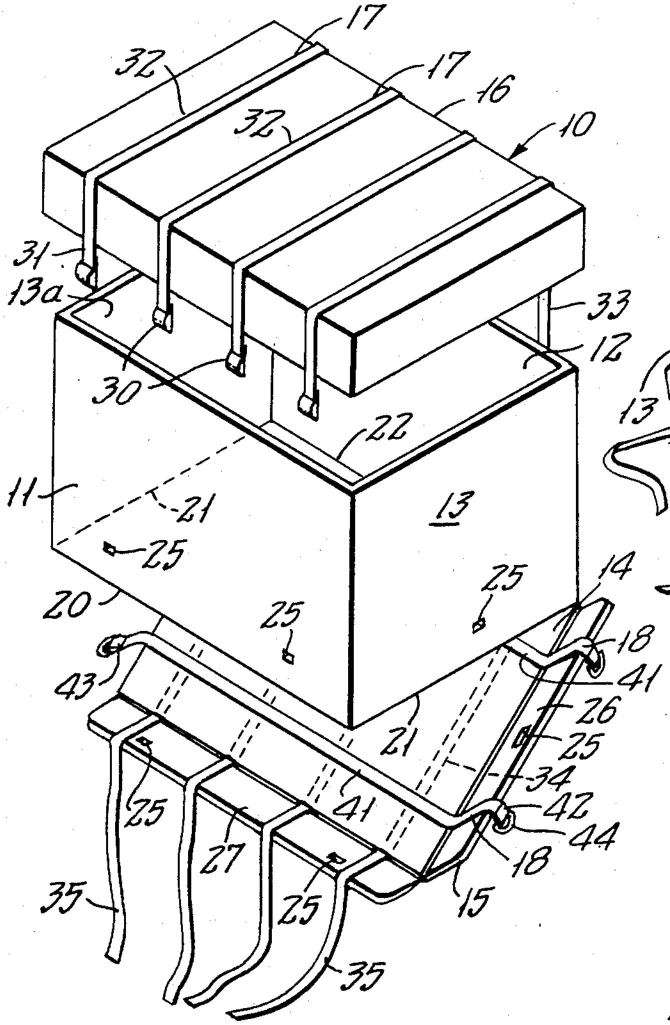
FIG. 1 is an exploded view in perspective showing an embodiment of the invention.

In accordance with the first embodiment of the invention, the device, generally indicated by reference character 10, is in the form of a collapsible, reusable shipping container, including first and second side walls 11 and 12, first and second end walls 13 and 13*a,* an integrated lower wall 14 and slip sheet 15, a separable cover or lid member 16, first strap members 17, and second strap members 18.

Figure 2:
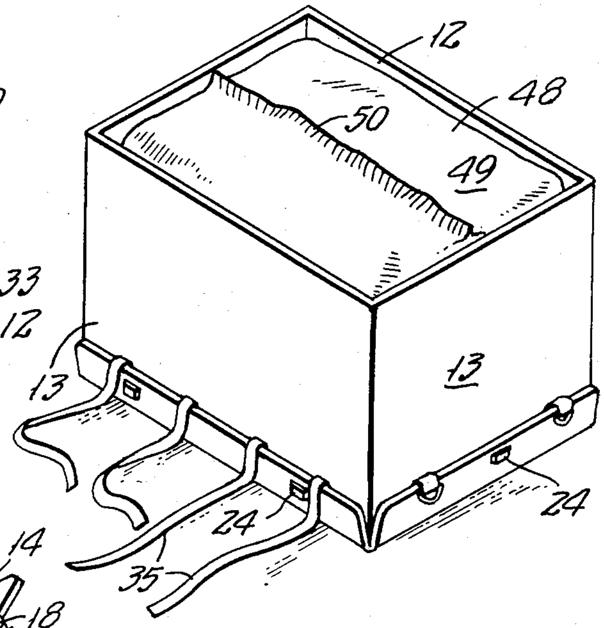
FIG. 2 is a partial assembly view in perspective showing the loading of a collapsible container for shipment.
Figure 3:
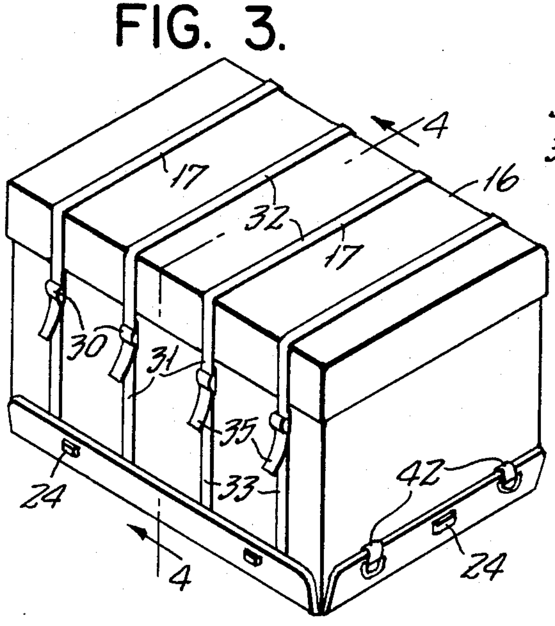
FIG. 3 is a view in perspective showing a completely assembled container ready for shipment.

In contrast to prior art constructions, the walls 11, 13, and 13*a,* are not interconnected to a bottom wall, but are bounded by lower free edges 20 and 21. The structure 14–15 is foldably interconnected along a single rectilinear edge 22 (FIG. 7), and is maintained in closed condition as shown in FIGS. 2 and 3 prior to loading by a plurality of generally rectangular members 24 of expandable types which engage corresponding openings 25 so as to maintain side and end flaps 26 and 27 of the slip sheet 15 in an engaged condition as shown in FIGS. 2 and 3. This fastening will normally insufficient to maintain the structure once the device is loaded.

Additional support is provided after loading as shown in FIG. 2 by the first strap members 17, which may be four in number, each including fastening means 30 and a continuous length of webbing 31 including a cover engaging portion 32, a side wall engaging portion 33 and bottom wall engaging portion 34, as well as a free end portion 35, which engages the means 30. As best seen in FIG. 1, the strap means 17 is held captive by threading the same through the interstice (not shown) which exists between the lower wall 14 of slip sheet 15.

The second strap members 18 perform an entirely distinct function, and are used at the time that the filled container is unloaded. As best seen in FIG. 1, the straps 18 are two in number, each including a medial segment 41 and end segments 42 and 43 terminating in "D" rings. The end segments 42 and 43 may be longer, if desired, in which case the free ends will be folded beneath the cover member 16 after the device is loaded.

Referring to FIG. 2, as a first step in the loading, there is provided a synthetic resinous sack-like flexible container or bag 48, which includes an upper wall 49 having a sealed edge 50, which is closed after the particular contents of the load have been positioned. In loaded condition, the bag 48 includes a pair of side walls 51 and a pair of end walls 52 which will normally overlie the inner surfaces of the walls 11–13*a*.

Figure 4:
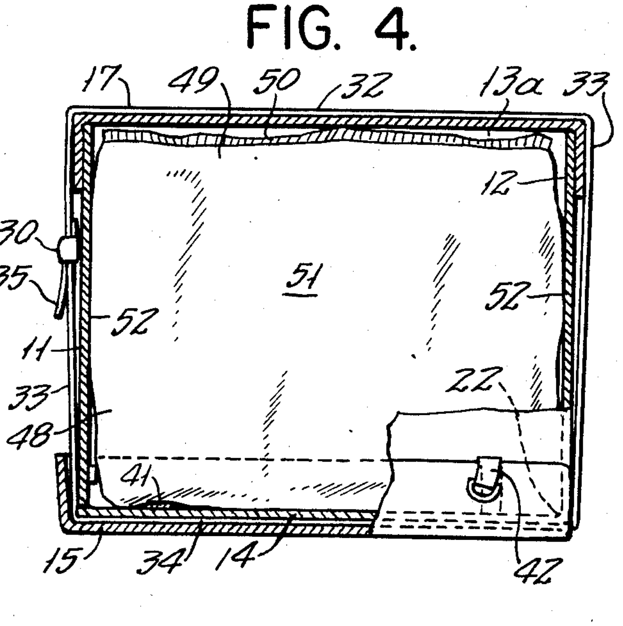
FIG. 4 is a transverse sectional view as seen from the plan 4—4 in FIG. 3.

Once loaded, as seen in FIGS. 3 and 4, the cover member 16 is positioned, and the first strap members 17 are interconnected to provide adequate support for the lower wall and slip sheet 14–15 during shipment. In this condition, the container may be handled in normal manner, using fork lifts, and may be stacked consistent with normal requirements.

Figure 5:
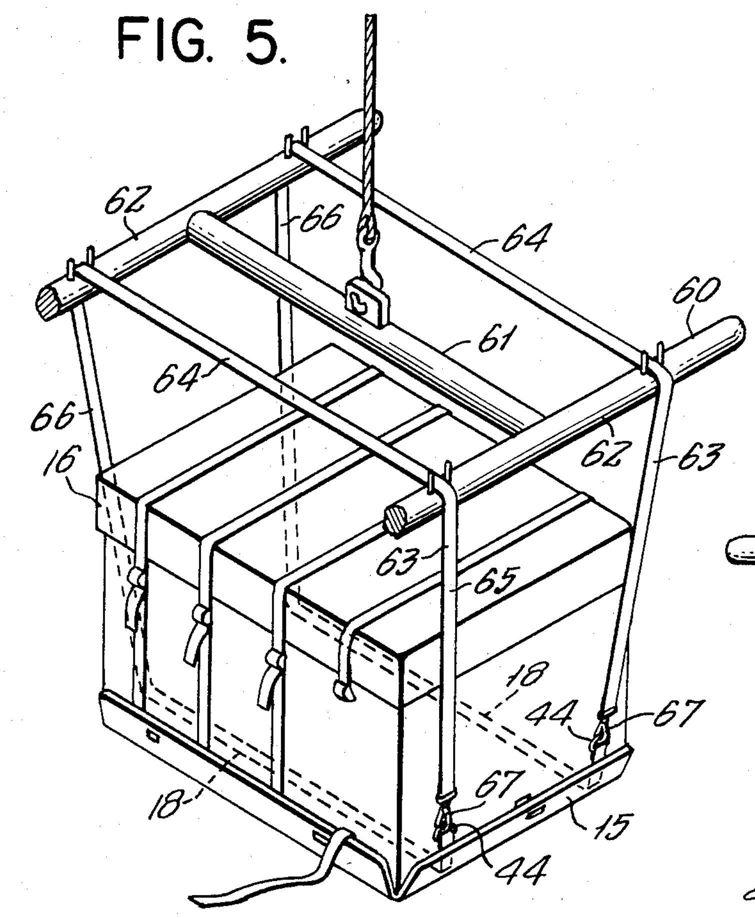
FIG. 5 is a view in perspective showing a first step in the unloading of the container shown in FIGS. 3 and 4.

Referring to FIG. 5, the container is illustrated in position for unloading in an area provided with an overhead transport mechanism (not shown) capable of supporting the containers from the second strap members 18. Conveyor systems of this type will normally include "H" frame elements 60 having a central member 61 and a pair of side members 62 which support depending straps 63 which include a horizontal segment 64 and vertical segments 65 and 66. At the lower ends of the segments 65 and 66 are snap rings 67 which engage the D rings 44 of the strap members 18.

Figure 6:
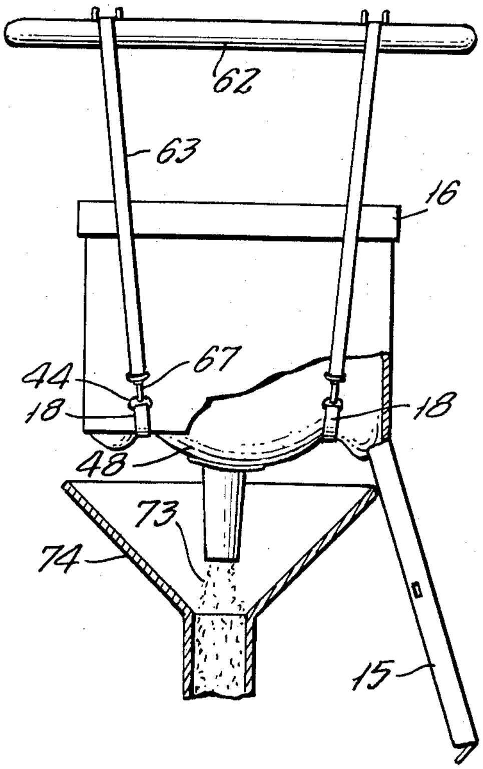
FIG. 6 is a fragmentary view in elevation, partly in section, showing the completion of the unloading of the container.

Referring to FIG. 6, the device 10 is transported to an unloading station wherein the contents 73, normally of particulate nature, may be drained into a hopper 74 or similar receptacle. In this position, the first strap members 17 are released permitting the integrated wall and slip sheet 14–15 to drop, so that the bag 48 is supported only by the strap members 18. Once positioned over the hopper 74, the bag 48 is cut, permitting the contents thereof to flow under gravity and progressively drain. When the bag 48 is completely emptied, on occasion with the assistance of the operator, the conveyor including the "H" frame elements 60 is moved to another location, following which the snap rings 67 are disconnected, the bag 48 discarded, and the container readied for return shipment.

Figure 7:
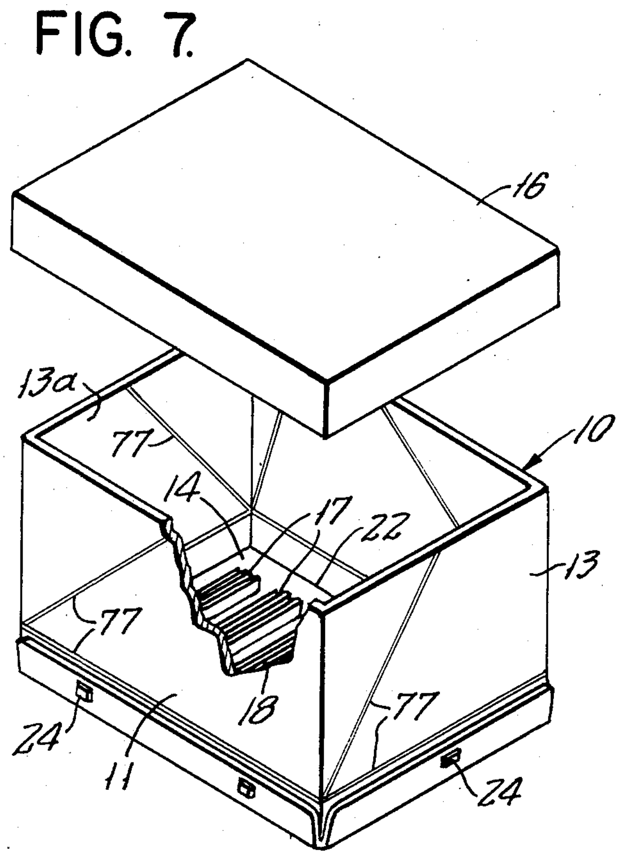
FIG. 7 is an exploded view in perspective showing a first step in the collapsing of an unloaded container for return shipment.
Figure 8:
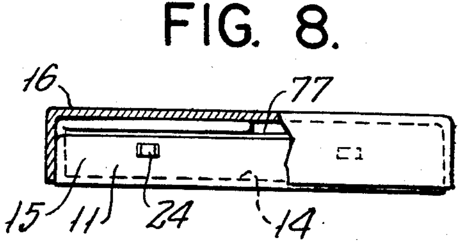
FIG. 8 is a side elevational view, partly broken away to show detail of a fully collapsed container.
Figure 9:
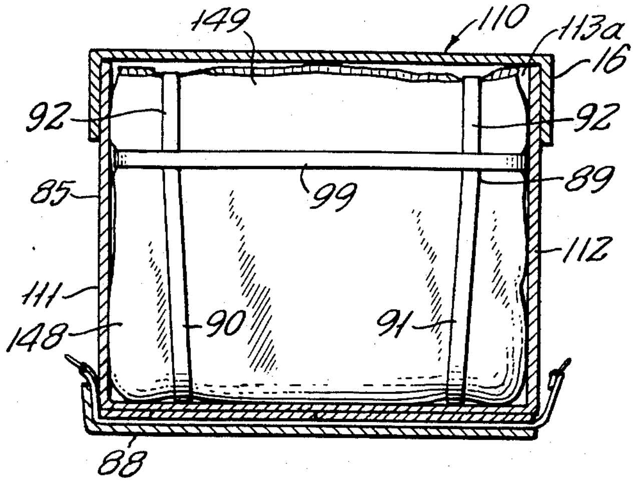
FIG. 9 is a transverse sectional view showing a second embodiment of the invention in fully loaded condition and prior to unloading.

Referring to FIG. 7, the device 10 may be collapsed in normal manner after refastening the lower wall, by folding along fold lines 77, as known in the art. The strap members 17 and 18 are stored beneath the cover 16, and the cover placed over the folded body of the container wherein a condition shown in FIG. 8 is obtained. If desired, one of the strap members 17 may be used to hold the collapsed device in unitary condition.

In accordance with the second embodiment, generally indicated by reference character 85, the container element is of entirely conventional configuration, in which the lower wall 88 is interconnected completely to the side and end walls 111–113*a*. In lieu of the strap members 17 and 18, there is provided a unitary harness element 89 which includes first and second strap members 90 and 91, each having vertical segments 92 with D rings 93 at the ends thereof. Horizontal lower segments 94 are interconnected with first and second U shaped members 95 and 96 including vertical portions 97 and horizontal portions 98. A peripheral member 99 is positioned to normally be disposed below the upper wall of the bag 148.

Figure 11:
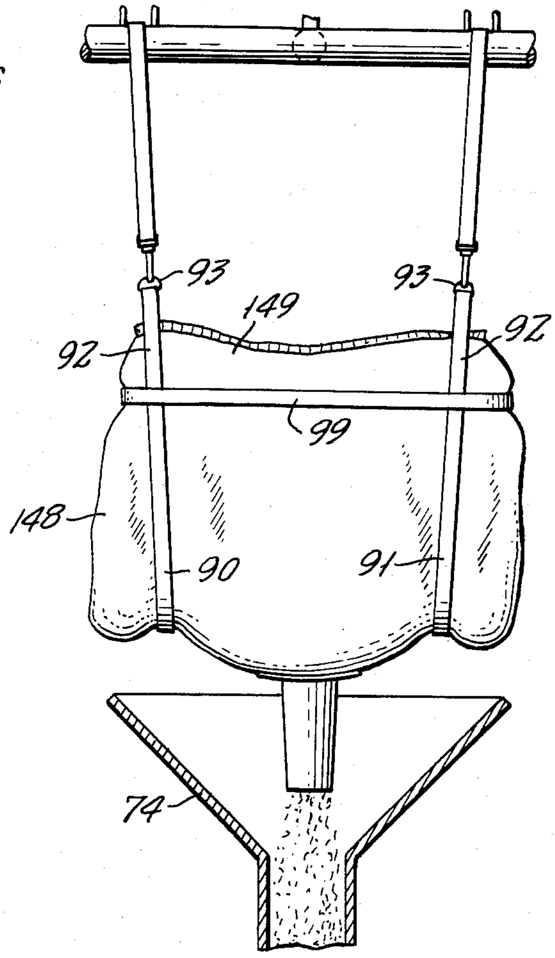
FIG. 11 is a similar view in perspective, partly in section, showing a second step in the unloading of the second embodiment.
Figure 10:
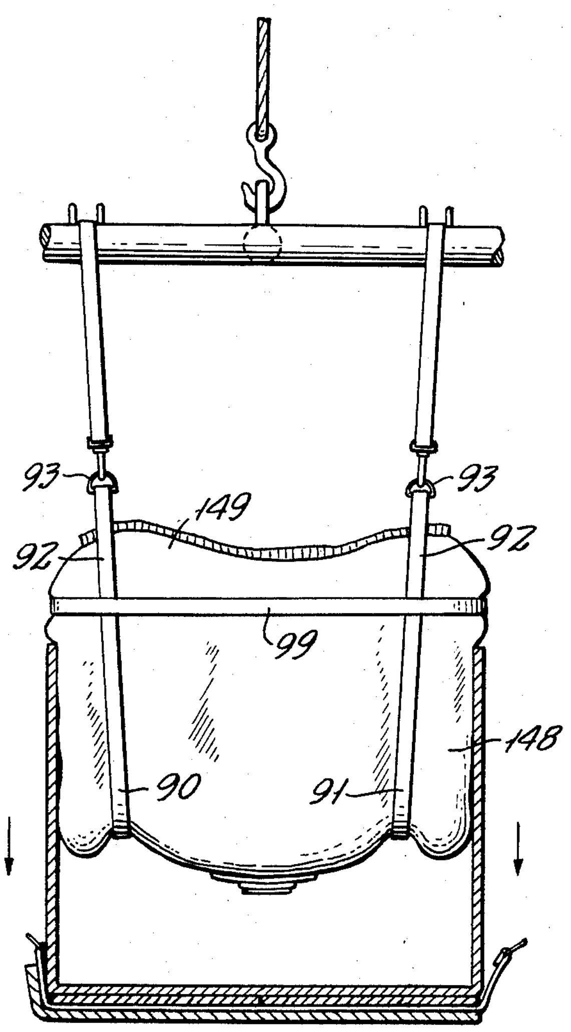
FIG. 10 is a view in elevation, partly in section, showing a first step in the unloading of the second embodiment.
Figure 12:
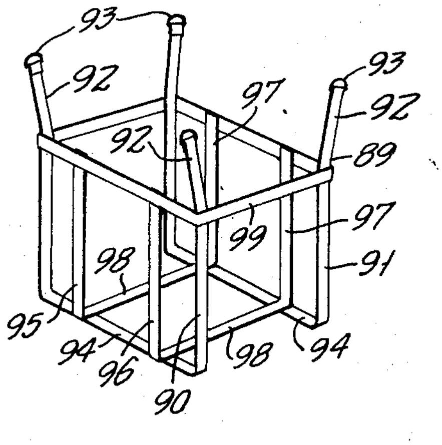
FIG. 12 is a view in perspective showing a strap harness forming part of the second embodiment.

From my consideration of FIGS. 10 and 11, it will be apparent that the harness is employed to lift the bag relative to the container in a single motion, following which the draining of the bag is similar to that in the first embodiment, following which the bag is discarded. The container 110 is then collapsed in normal manner, storing the harness element 89 beneath the cover member 16, along with any reinforcing elements (not shown) which are employed.

It will be observed that in both embodiments, the particular contents of the container are confined within a disposable sack-like bag which, although possibly contaminated during shipment, protects the interior of the shipping container itself so that it may be collapsed and reused many times before ultimate disposal. On the other hand, as contrasted with making a shipment using only the expendable bag, when using a collapsible shipping container, the bag and contents are independently protected against damage, pilferage, puncture and the like without significantly adding to shipping weight, and with much greater space utilization during shipping.

Turning now to the second embodiment of the invention, illustrated in FIGS. 9 through 12, various points corresponding to those of the first embodiment have been designated by similar reference characters with the additional prefix "1".

The second embodiment of the invention comprises a somewhat simplified system in which my previously used collapsible containers may be employed in lieu of the container disclosed herein above without substantial modification.

In the second embodiment, the strap elements do not pass beneath the lower free edges of three of the side walls. Instead, the strap element is interconnected by cross members to form a rectangular strap element through which the sack-like containers are drained.

The loaded collapsible container is first normally moved to a place of drainage, following which the inner sack member is lifted free of the collapsible container, which may then be removed and collapsed for shipment. The strap elements supporting the sack-like container are then moved over a drain hopper or similar article, and the undersurface of the sack is cut using a convenient knife or other tool, whereby the contents of the sack-like container are drained. Once drained, the sack-like container is discarded.

While the second embodiment combines some of the aspects of the traditional method of shipping using sacks alone, in the present case, the sacks are enclosed within a collapsible shipping container for the major portion of the transporting period, thereby protecting the sacks from both soiling and puncture, and yet permitting reuse of the outer containers for the reason that no contamination of them occurs.

I wish it to be understood that I do not consider the invention limited to the precise details of structure shown and set forth in this specification, for obvious modifications will occur to those skilled in the art to which the invention pertains.

I claim:

1. In a collapsible shipping carton including a bottom wall, a slip sheet laminated to said bottom wall; a plurality of collapsible side walls selectively foldable to overlie said bottom wall, and a cover element adapted to selectively overlie said side walls in erect and folded condition, the improvement comprising: said bottom wall and slip sheet being in non-interconnected relation to lower edges of three of said side walls, and foldably interconnected to the remaining ones of said side walls at a lower edge thereof; means for selectively interconnecting said slip sheet along at least one additional side edge to a respective side wall in the area of a lower edge thereof; a plurality of flexible elongated straps positioned between said lower edges of said side walls and above an upper surface of said bottom wall, each of said straps terminating in D ring means selectively engageable with corresponding lift means to support said container without supporting said bottom wall, in which condition said straps partly overlie said free lower edges of said side walls; and a sack-like container positioned within said side walls and having a bottom surface supported by said straps, said sack-like container being rupturable to permit the draining of the contents thereof through interstices between said straps.

2. In a combination including a collapsible shipping container including a plurality of collapsible side walls, a bottom wall upon which said side walls are selectively collapsed, and a cover element selectively overlying said side walls, the improvement comprising: a flexible strap element including a pair of elongated strap members, each having a pair of ends terminating in loops selectively engageable by vertical lifting means, said pair of strap members being joined by at least one transversely extending member to form a free opening on either side thereof; a flexible sack-like container having, in filled condition, a continuous side wall, and an underlying wall area; said strap element being disposed within said shipping container with said free ends extending upwardly with said side walls thereof, said sack-like container, in filled condition, being positioned within said collapsible container to overlie said strap element; whereby upon the unloading of said container element, the free ends of said strap element are engaged by a lifting means to elevate said sack-like container from said collapsible container, said collapsible container may be removed, and said sack-like container punctured to drain the contents thereof.

3. The method of shipping a fluid product using a collapsible, reusable, generally rectangular shipping container, comprising the steps of:

(a) providing a collapsible container having four side walls, a bottom wall, and a cover element selectively overlying said side walls;

(b) providing a flexible sack-like container of dimensions approximating the interior dimensions of said collapsible container when in erected condition;

(c) providing a flexible strap element having at least two elongated straps each having a pair of free ends having loop means for engaging a lifting means;

(d) positioning said strap element within the confines of said collapsible container;

(e) positioning said sack-like container upon said strap element, and sealing said collapsible container;

(f) positioning said cover element upon said side walls;

(g) transporting said collapsible container to a desired location;

(h) removing said cover element;

(i) lifting said sack-like container free of engagement of at least the bottom wall of said collapsible container using said strap element and;

(j) rupturing said sack-like container at a lower surface area thereof to drain the contents thereof.

* * * * *